Figure 1:
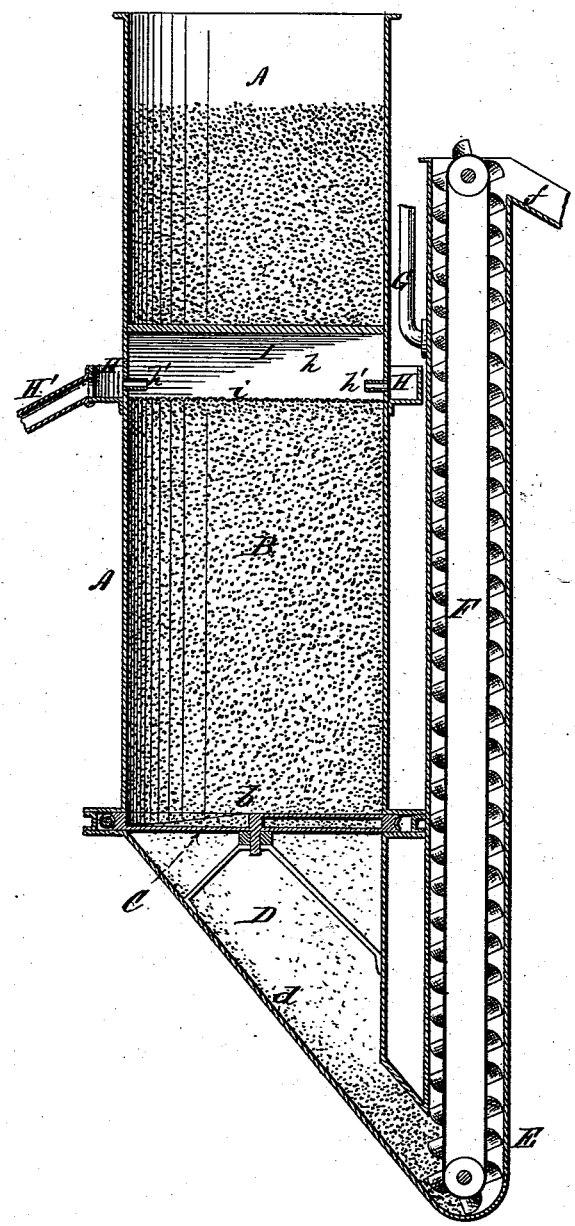

(No Model.)

E. E. QUIMBY.
DRAINING DEVICE FOR UPWARDLY ACTING BONE BLACK FILTERS.

No. 340,005. Patented Apr. 13, 1886.

Witnesses:
Geo. H. Miatt
R. C. Howes

Inventor:
Edw. E. Quimby

UNITED STATES PATENT OFFICE.

EDWARD E. QUIMBY, OF ORANGE, ASSIGNOR TO THE F. O. MATTHIESSEN & WIECHERS SUGAR REFINING COMPANY, OF JERSEY CITY, N. J.

DRAINING DEVICE FOR UPWARDLY-ACTING BONE-BLACK FILTERS.

SPECIFICATION forming part of Letters Patent No. 340,005, dated April 13, 1886.

Application filed January 23, 1886. Serial No. 189,546. (No model.)

*To all whom it may concern:*

Be it known that I, EDWARD E. QUIMBY, of Orange, New Jersey, have invented a certain Improvement in Draining Devices for Upwardly-Acting Bone-Black Filters, of which the following is a specification.

This improvement is applicable to the class of filters in which sugar-liquor is decolorized by causing it to flow upward through the lower portion of a vertical column of bone-black and to be drained from the side of the column. In the bone-black filter of this type shown and described in Letters Patent of the United States No. 329,330, dated October 27, 1885, granted to Franz O. Matthiessen and Edward E. Quimby, assignors, &c., the device for draining the filtered sugar-liquor from the column of bone-black consists of a series of horizontal troughs extending across through the column of bone-black, and connecting at their opposite ends with apertures in the wall of the filtering-chamber, through which the filtered sugar-liquor is discharged into an exterior annular trough, from which it is conducted away, as required.
The said troughs are protected above by inverted-V-shaped shields, and the bone-black is prevented from making its way upward into the troughs by means of suitably-fine sieves extending across from the lower edge of one wing to the lower edge of the other wing of the shields underneath the troughs.

The present improvement consists in dispensing with the said troughs, and in establishing horizontal discharge-channels for the withdrawal of the filtered sugar-liquor from the column of bone-black by a system of horizontal pipes provided with fine perforations upon their under sides, and extending through the column of bone-black at the desired elevation, and connecting at their ends with the apertures in the wall of the filtering-chamber. The unperforated portion of each of the said pipes constitutes a shield which prevents the superincumbent bone-black from falling into the discharge-channel established within the pipe. On the other hand, the bone-black beneath the pipe is prevented from making its way upward into and clogging the discharge-channel, because of the fineness of the perforations in the under side of the pipe, or, if such perforations are large, then by the application to them of a suitably-fine protecting-sieve. It will of course be understood that the unperforated part of the pipe, instead of being semicircular in its cross-section, may be of an inverted V shape in cross-section, and be provided at the bottom with a horizontal perforated shield.

Figure 2:
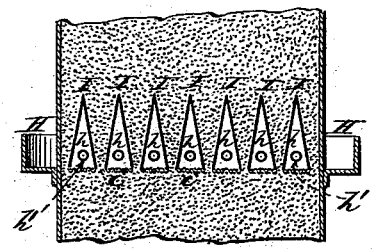
Figure 3:
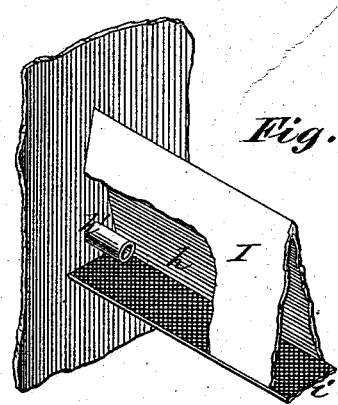
Figure 4:

The accompanying drawings, illustrating a bone-black filter containing the improvement, are as follows:

Figure 1 is a central vertical section. Fig. 2 is a vertical section through the line *x x* on Fig. 1. Fig. 3 is an isometrical perspective of a portion of a drain-pipe triangular in its cross-section and provided with a flat perforated bottom. Fig. 4 is a transverse section of a cylindrical drain-pipe having its lower half perforated.

The apparatus represented in the drawings embraces a vertical cylinder, A, containing a column of bone-black, B, supported at the bottom upon a suitably slotted or perforated rotatable diaphragm, C, for gradually discharging the exhausted bone-black from the bottom *b* of the column of bone-black. The exhausted bone-black falls into a receiving-chamber, D, by the inclined bottom *d* of which it is conducted by its own gravity into the well E, from which it is elevated by suitable means—such as the chain-and-bucket elevator F—and discharged upon the inclined chute *f* at the top of the well.

The saccharine liquor to be decolorized, introduced into the well by means of the pipe G, falls to the bottom of the well and rises by hydrostatic pressure through the mass of bone-black, B, contained in the filtering-chamber, and is discharged therefrom by means of a series of transverse draining-channels, *h h h*, &c., through the apertures or nozzles *h' h' h'*, &c., into the exterior annular trough H, surrounding the cylinder A, from which it is conducted off, as required, by the discharge-pipe H'.

The invention which forms the subject of the present application resides solely in the means adopted for establishing the series of discharge-channels *h h h*, &c., extending transversely through the column of bone-black. The means adopted for this purpose consists of a series of horizontal pipes extending across the filtering-chamber, and having their lower portions suitably perforated. These pipes may be either triangular in their cross-section, as represented in Figs. 2 and 3, or circular, as represented in Fig. 4; but in either case their under portions are either finely perforated or are composed of suitably-fine sieves. The triangular pipes I I I, &c., are preferred, because the superincumbent bone-black is less likely to lodge upon them than it is upon the top of the cylindrical form of pipe J. If the latter is used, it may be constructed with the perforated lower portion, $j$. If the triangular form of pipe is employed, its flat bottom may be composed of the wire sieve $i$.

The distinction between this means for effecting the withdrawal of the filtered sugar-liquor from the column of bone-black and that represented in Letters Patent of the United States No. 329,330, hereinbefore referred to, consists in the fact that in the latter case the solid bottoms of the troughs constitute the bottom of the discharge-channels, while in the present case the bottoms of the discharge-channels consist of the surfaces of those portions of the column of bone-black which are immediately beneath the pipes, and which are held down by the perforated lower portions of the pipes.

What is claimed as the invention is—

In apparatus for decolorizing sugar-liquor by the process of upward filtration through a column of bone-black, the combination of the filtering-chamber, provided with suitable discharge-outlets in its side walls, with a series of pipes which have their lower portions perforated, and which extend transversely through the column of bone-black in appropriate relation to the openings in the side walls, respectively, whereby transverse discharge-channels are established for the withdrawal of the sugar-liquor from the column of bone-black at a prescribed elevation above the bottom thereof.

EDW. E. QUIMBY.

Witnesses:
R. C. HOWES,
M. L. ADAMS.